(No Model.)  2 Sheets—Sheet 2.

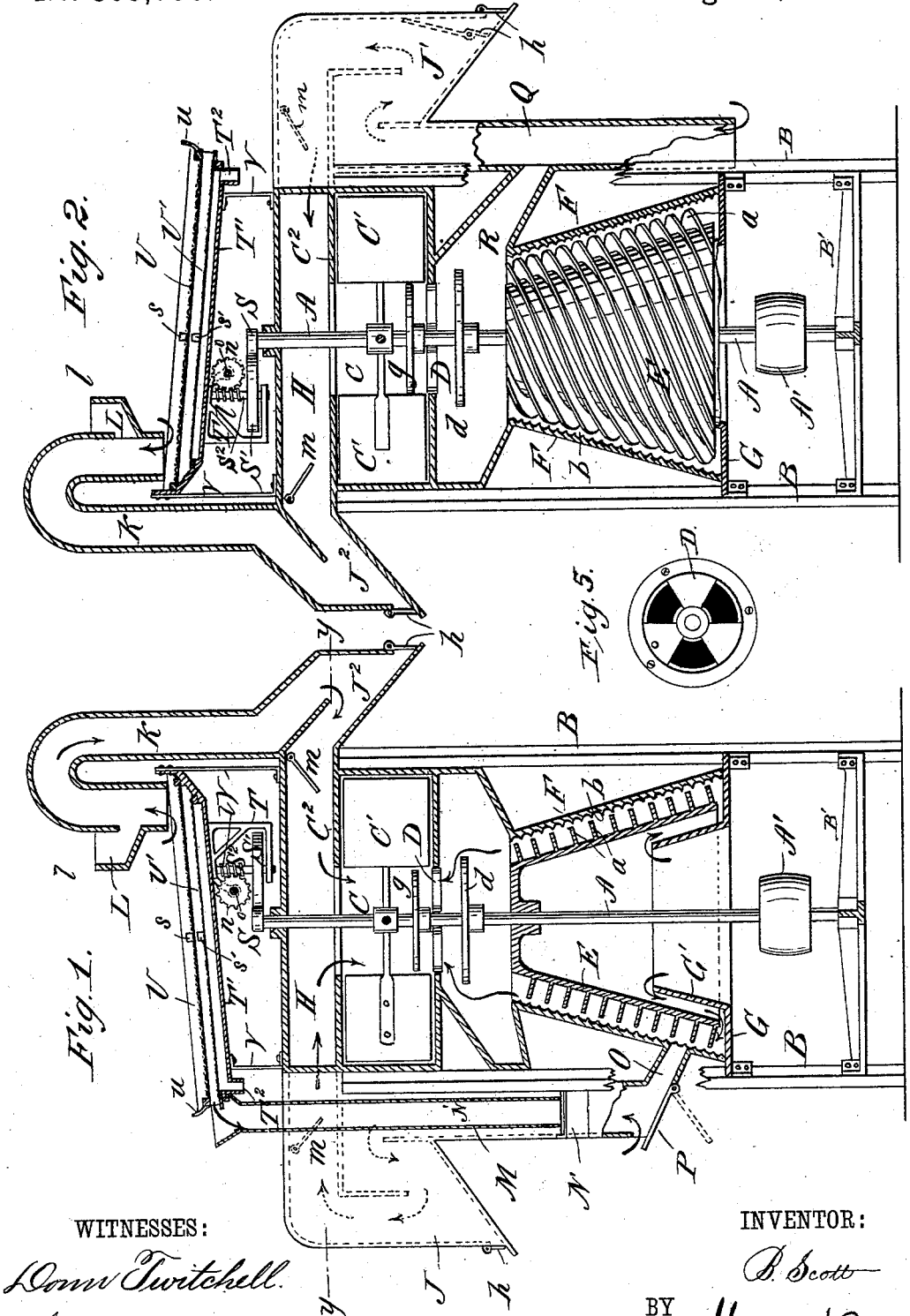

B. SCOTT.
GRAIN CLEANER.

No. 303,756. Patented Aug. 19, 1884.

WITNESSES  
Donn Twitchell  
C. Sedgwick

INVENTOR:  
B. Scott  
BY Munn & Co  
ATTORNEYS.

UNITED STATES PATENT OFFICE.

BERTRAND SCOTT, OF KEYSER, WEST VIRGINIA.

GRAIN-CLEANER.

SPECIFICATION forming part of Letters Patent No. 303,756, dated August 19, 1884.

Application filed November 12, 1883. (No model.)

*To all whom it may concern:*

Be it known that I, BERTRAND SCOTT, of Keyser, in the county of Mineral and State of West Virginia, have invented a new and useful Improvement in Grain-Cleaners, of which the following is a full, clear, and exact description.

The object of my invention is to provide a new and improved machine for taking off the fuzz or beard from the small ends of grains of wheat, and also removing any foreign matter which may adhere to the grain, thus leaving the grain cleaned and polished.

The invention consists in the peculiar construction and arrangement of parts, as hereinafter fully described, and pointed out in the claims.

Reference is to be had to the accompanying drawings, forming a part of this specification, in which the same letters of reference indicate the same or corresponding parts in all the figures.

Figure 3:
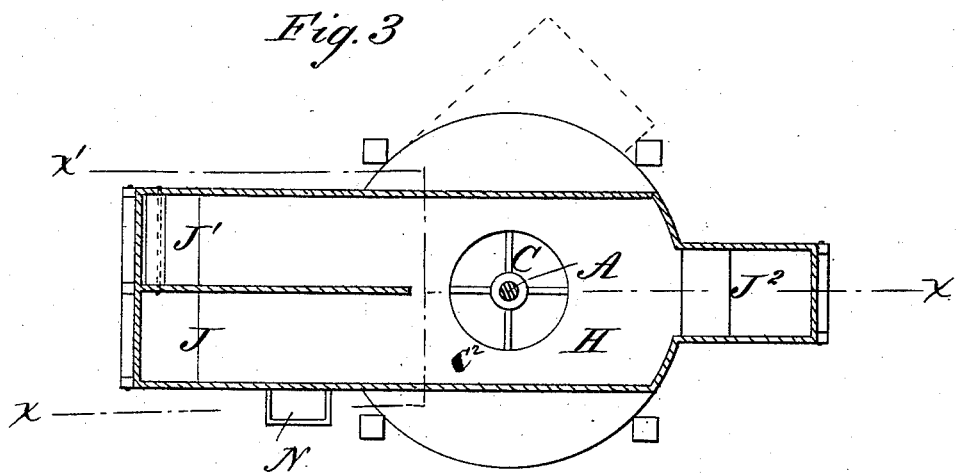
Figure 4:
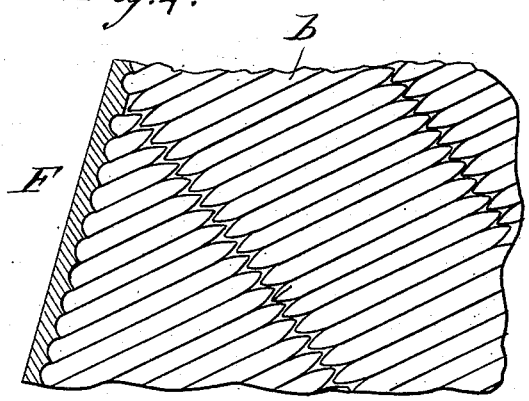

Figure 1 is a longitudinal sectional elevation of my improved grain-cleaner on the line $x\ x$, Fig. 3, looking in one direction, parts being broken away. Fig. 2 is a like sectional elevation on the line $x'\ x'$, and looking in the opposite direction, the revolving scourer being shown in elevation. Fig. 3 is a sectional plan view on the line $y\ y$, Fig. 1. Fig. 4 is a detail face view of the inner surface of the grooved casing surrounding the scourer. Fig. 5 is a plan view of the register-valve in the bottom of the blower.

A vertical shaft, A, provided with a belt-pulley, A', is journaled in a bottom cross-piece, B', uniting standards B, forming the frame of the machine. On the shaft A a series of wings, C', of a blower or fan, C, are mounted, which wings revolve in a fan or blower casing, $C^2$, forming the upper part of the machine. In the bottom of the casing $C^2$ a register-valve, D, is arranged, for regulating the current of air. Below the fan-casing is a cone-frustum, E, which is closed at the top and open at the bottom, and is provided with a series of spiral ridges, $a$, forming spiral grooves. The cone-frustum E is surrounded by a cone-frustum casing, F, provided in its inner surface with a series of spiral half-round grooves, $b$, arranged in sections, as shown in Fig. 5, the ends of the grooves being tapered or pointed, as shown. The casing F rests on an annular plate, G, provided with an upwardly-inclined flange, G', on its inner edge, which flange is concentric with and within a short distance of the inner surface of the frustum E. A circular deflector-plate, $d$, is mounted on the shaft A a short distance above the top of the frustum E, and a like deflector-plate, $g$, is mounted on the shaft A a short distance above the bottom of the fan or blower casing $C^2$, to deflect and retard the currents of air passing into said casing. On the top of the casing $C^2$ a wind-box, H, is arranged, which is provided with three settling-chambers, J J' $J^2$, the settling-chambers J and $J^2$ each being provided with an outwardly-swinging hinged gate, $h$, at the bottom of the end, and the chamber J' being provided with two gates, $h$. As the imperfect grains, &c., collect in the said chamber J', the two gates open alternately, discharging the screenings and preventing a current of air from passing into the machine and carrying the screenings to the fan C. The settling-chambers are each provided with valves $m$, for regulating the current of air. From the chamber $J^2$ a suction-pipe, K, extends upward to a hopper, L, which is located above the top of the machine. From the chamber J a suction-pipe, M, extends down to a hopper, N, from which a spout or chute, O, leads to and through the lower part of the casing F, which spout O is provided with a downwardly-swinging gate, P. A suction-pipe, Q, extends from the chamber J' down to near the base of the machine, and a spout, R, extends from the top of the casing F into the suction-pipe Q. On the upper end of the shaft A an eccentric-disk, S, is mounted, which is adapted to act on a disk, S', mounted on a shaft, $S^2$, journaled in a frame, T, secured to and projecting from the bottom of a board or frame, T', to which a coarse and a fine screen, U and U', respectively, are secured, which board or frame T' is secured at the ends to spring-standards V V, fastened on the top of the wind-box H or other parts of the frame, so that the said frame carrying the screens can be rocked or vibrated.

$l$ is a worm on shaft $S^2$, meshing with a worm-wheel, $n$, on a shaft, $o$, journaled in suitable bearings on the bottom of the frame T', for operating mechanism for imparting through the medium of the bars S S' a jarring action to the screens. This, however, forms no part of the present invention and therefore does not need further description.

The operation is as follows: The grain &c., is fed into the hopper L formed on the side of the suction-pipe K, and passes from the said hopper through the said pipe upon the upper screen, U. In passing through the pipe the grain is met by an ascending current of air passing through the suction-pipe K, which current of air carries off the straws, sticks, &c., lighter than the grain, which would clog the screens, and the dust, which would otherwise fly around the mill. If any screenings worth saving are carried upward, they accumulate in the lower part of the chamber $J^2$, and are removed by the opening of the gate of the said chamber $J^2$. The grain then passes through the screen U, the sticks, stones, &c., which are as heavy or heavier than the grain collecting on the lower part of the screen, which is provided with an end ledge, $u$, to carry the sticks, stones, &c., off to one side, where they fall into a suitable receptacle. The grain that has passed upon the lower screen, U', slides down the same and drops from the lower end of the said screen into a spout, N', leading to the hopper N. The screenings that pass through the lower screen, U', slide down the plate or board T' and out through the outlet $T^2$ at the lower end of the same. When the shaft A is being revolved, the eccentric-disk S acts on the disk S', and thus gives the screens a reciprocating movement in the direction of their length, the screens rocking with the spring-standards V. At the same time the disk S' is revolved by the eccentric-disk S. The grain to be scoured passes from the screen U through the spout N' to the hopper N, and from thence through the chute O into the spiral grooves formed by the ridges $a$ in the outer surface of the cone-frustum E, is driven upward, and is finally delivered into the spout R, down which it slides and comes into the suction-pipe Q, in which suction-pipe Q the imperfect grains, &c., are separated and carried off to the chamber J'. The suction-pipe M carries off any dust, &c., remaining in the grain that drops into the hopper N. A suitable receptacle is placed under the suction-pipe Q to receive the scoured grain dropped through the same.

I will now describe one grain of wheat in its upward journey on the scourer E.

When the grain is first caught by the spiral ridges $a$, it commences to slide around and up the spiral ridges until its velocity is such that it flies upward and outward at an angle determined by the pitch of the said spirals, when it is thrown against the spirally corrugated or grooved casing F, and as the said corrugations or grooves run upward or around the said casing in the same way that the grain is moving, the grain strikes into one of the grooves and slides around in it, whereby any adhering impurities are taken off. When the grain comes to the end of the groove where the said groove rises abruptly from its bottom to the inner surface of the casing, the end of the grain strikes the end of the spiral grooves and slides out, whereby the end of the grain is scoured, and the beard or hairs on the small end of the grain are removed. During about one-half of the time the large end of the grain will be foremost; but the operation is repeated so often, and as the grooves $b$ in the casing F are arranged in sections, the small end is sure to be in such position such a number of times that the beard on the small end of the grain is sure to be rubbed off. A strong current of air ascends in the space between the scourer or frustum E and the casing F, and this current of air carries off the dust, fuzz, and all light stuff from the scourer. The current of air can be regulated by the register D. The air has also a lifting tendency, and this assists in lifting the grain. By increasing or decreasing the current of air the time that the grain requires in passing through the scourer can be decreased or increased. The space between the scourer E and the casing F should not be filled with grain from the top to bottom, as in that case the grain would be simply conveyed upward; but the grain must be fed to the scourer in such a manner that the grains can be moved freely.

The above-described machine is compact and simple in construction, it removes all dust and impurities from the grain, and thoroughly scours the grain, which is polished and cleaned without being broken or crushed.

Having thus described my invention, I claim as new and desire to secure by Letters Patent—

1. In a grain-cleaner, the combination, with a conical revolving scourer, of a casing surrounding said scourer, provided on its inner surface with spiral half-round grooves arranged in groups and having both ends tapered or pointed, substantially as herein shown and described.

2. In a grain-cleaner, the combination, with the revolving scourer E, provided with the spiral ridges $a$, of the casing F, surrounding said scourer, and provided with spiral half-round grooves arranged in groups and having pointed or tapered ends, substantially as herein shown and described.

3. In a grain-cleaner, the combination, with the casing F and the hollow scourer E, having its upper end closed, of the annular plate G, having the upwardly-inclined flange G' of less diameter than the scourer and projecting a short distance into the lower end of the said scourer, substantially as herein shown and described.

4. In a grain-cleaner, the combination, with a separator, of the conical and spirally-grooved scourer E, the spirally and sectionally grooved casing F, the fan-blower C, the suction-pipes M Q, the hopper N, and spouts O R, substantially as herein shown and described.

5. In a grain-cleaner, the combination, with the scourer E and casing F, of the blower C, arranged above the scourer and casing, and provided with the valve D in its bottom, substantially as herein shown and described, whereby the current of air can be regulated, as set forth.

6. In a grain-cleaner, the combination, with the shaft A, the scourer E, and the casing F, of the blower C, provided with the valve D, and the deflectors $d\ g$, secured to the shaft A, substantially as herein shown and described, and for the purpose set forth.

BERTRAND SCOTT.

Witnesses:
J. H. JOHNSON,
CHAS. E. BLONDEL.